US011871422B2

(12) United States Patent
Sakhnini et al.

(10) Patent No.: US 11,871,422 B2
(45) Date of Patent: Jan. 9, 2024

(54) FREQUENCY ALLOCATION FOR CHANNEL STATE INFORMATION REFERENCE SIGNALS

(71) Applicant: QUALCOMM Incorporated, San Diego, CA (US)

(72) Inventors: Iyab Issam Sakhnini, San Diego, CA (US); Tao Luo, San Diego, CA (US); Juan Montojo, San Diego, CA (US); Jelena Damnjanovic, Del Mar, CA (US); Wooseok Nam, San Diego, CA (US); Mahmoud Taherzadeh Boroujeni, San Diego, CA (US); Yan Zhou, San Diego, CA (US); Peter Gaal, San Diego, CA (US); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/170,445

(22) Filed: Feb. 8, 2021

(65) Prior Publication Data

US 2021/0289533 A1    Sep. 16, 2021

Related U.S. Application Data

(60) Provisional application No. 62/988,112, filed on Mar. 11, 2020.

(51) Int. Cl.
*H04W 72/04* (2023.01)
*H04L 41/0803* (2022.01)
(Continued)

(52) U.S. Cl.
CPC ............ *H04W 72/23* (2023.01); *H04L 5/0048* (2013.01); *H04L 41/0803* (2013.01); *H04W 72/0453* (2013.01)

(58) Field of Classification Search
CPC .............. H04W 72/23; H04W 72/0453; H04L 5/0094; H04L 5/10
See application file for complete search history.

(56) References Cited

U.S. PATENT DOCUMENTS

2016/0330004 A1    11/2016    Kim et al.
2017/0295570 A1 *  10/2017    Awad ................ H04W 72/0446
(Continued)

FOREIGN PATENT DOCUMENTS

WO    WO-2018143721 A1 *    8/2018    ........... H04B 7/0617
WO    WO-2019164302 A1 *    8/2019    ........... H04L 5/0048

OTHER PUBLICATIONS

International Search Report and Written Opinion—PCT/US2021/017254—ISA/EPO—dated Jun. 8, 2021.
(Continued)

*Primary Examiner* — Yee F Lam
(74) *Attorney, Agent, or Firm* — QUALCOMM Incorporated

(57) ABSTRACT

A user equipment (UE) may receive an indication of a frequency allocation of at least one of a dynamic resource grant, a semi-persistent scheduling (SPS) activation message or assignment, or a control resource set (CORESET) configuration for one or more communications with a base station. The UE may receive a set of channel state information reference signals having a configuration that is based at least in part on the frequency allocation of the at least one of the dynamic resource grant, the SPS activation message or assignment, or the CORESET configuration.

30 Claims, 6 Drawing Sheets

(51) Int. Cl.
*H04L 5/00* (2006.01)
*H04W 72/23* (2023.01)
*H04W 72/0453* (2023.01)

(56) References Cited

U.S. PATENT DOCUMENTS

| | | | | |
|---|---|---|---|---|
| 2019/0058517 A1* | 2/2019 | Kang | .................... | H04B 7/0626 |
| 2019/0239051 A1* | 8/2019 | Hwang | ............. | H04W 72/0453 |
| 2019/0246371 A1* | 8/2019 | Hwang | .................... | H04J 11/00 |
| 2020/0022143 A1* | 1/2020 | Abdoli | .................. | H04L 1/1864 |
| 2020/0037260 A1* | 1/2020 | Fu | ........................ | H04W 52/146 |
| 2020/0112355 A1* | 4/2020 | Park | ...................... | H04B 7/0626 |
| 2020/0120584 A1* | 4/2020 | Yi | ............................ | H04L 5/005 |
| 2020/0145982 A1* | 5/2020 | Cheng | .................. | H04L 5/0053 |
| 2020/0245233 A1* | 7/2020 | Qian | ..................... | H04W 48/18 |
| 2020/0252949 A1* | 8/2020 | Kim | .................. | H04W 72/1215 |
| 2020/0267730 A1* | 8/2020 | Kim | .................. | H04W 72/0453 |
| 2020/0404601 A1* | 12/2020 | Lin | ........................ | H04L 1/0072 |
| 2021/0243807 A1* | 8/2021 | Hooli | ...................... | H04L 47/76 |
| 2022/0110181 A1* | 4/2022 | Miao | ..................... | H04L 1/1822 |

OTHER PUBLICATIONS

Samsung: "Discussions on CSI-RS Design for NR MIMO", 3GPP Draft, 3GPP TSG RAN WG1 NR Ad-Hoc#2, R1-1710680 CSI-RS for CSI Acquisition Final, 3rd Generation Partnership-Project (3GPP), Mobile Competence Centre, 650, Route Des Lucioles, F-06921 Sophia-Antipolis Cedex, France, vol. RAN WG1. No. Qingdao, China, Jun. 27, 2017-Jun. 30, 2017 Jun. 26, 2017 (Jun. 26, 2017), XP051299886, 8 Pages, Retrieved from the Internet: URL:http://www.3gpp.org/ftp/Meetings_3GPP_SYNC/RAN1/Docs/ [retrieved on Jun. 26, 2017], section 4.

* cited by examiner

FREQUENCY ALLOCATION FOR CHANNEL STATE INFORMATION REFERENCE SIGNALS

CROSS-REFERENCE TO RELATED APPLICATION

This Patent Application claims priority to Provisional Patent Application No. 62/988,112, filed on Mar. 11, 2020, entitled "FREQUENCY ALLOCATION FOR CHANNEL STATE INFORMATION REFERENCE SIGNALS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for frequency allocation for channel state information reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include receiving an indication of a frequency allocation of at least one of a dynamic resource grant, a semi-persistent scheduling (SPS) activation message or assignment, or a control resource set (CORESET) configuration for one or more communications with a base station, and receiving a set of channel state information (CSI) reference signals (CSI-RSs) having a configuration that is based at least in part on the frequency allocation of the at least one of the dynamic resource grant, the SPS activation message or assignment, or the CORESET configuration.

In some aspects, a method of wireless communication, performed by a base station, may include transmitting, to a UE, an indication of a frequency allocation of at least one of a dynamic resource grant, an SPS activation message or assignment, or a CORESET configuration for one or more communications with the UE, and transmitting, to the UE, a set of CSI-RSs having a configuration that is based at least in part on the frequency allocation of the at least one of the dynamic resource grant, the SPS activation message or assignment, or the CORESET configuration.

In some aspects, a UE for wireless communication may include a memory and one or more processors operatively coupled to the memory. The memory and the one or more processors may be configured to receive an indication of a frequency allocation of at least one of a dynamic resource grant, an SPS activation message or assignment, or a CORESET configuration for one or more communications with a base station; and receive a set of CSI-RSs having a configuration that is based at least in part on the frequency allocation of the at least one of the dynamic resource grant, the SPS activation message or assignment, or the CORESET configuration.

In some aspects, a base station for wireless communication may include a memory and one or more processors operatively coupled to the memory. The memory and the one or more processors may be configured to transmit, to a UE, an indication of a frequency allocation of at least one of a dynamic resource grant, an SPS activation message or assignment, or a CORESET configuration for one or more communications with the UE, and transmit, to the UE, a set of CSI-RSs having a configuration that is based at least in part on the frequency allocation of the at least one of the dynamic resource grant, the SPS activation message or assignment, or the CORESET configuration.

In some aspects, a non-transitory computer-readable medium may store one or more instructions for wireless communication. The one or more instructions, when executed by one or more processors of a UE, may cause the one or more processors to receive an indication of a frequency allocation of at least one of a dynamic resource grant, an SPS activation message or assignment, or a CORESET configuration for one or more communications with a base station, and receive a set of CSI-RSs having a configuration that is based at least in part on the frequency allocation of the at least one of the dynamic resource grant, the SPS activation message or assignment, or the CORESET configuration.

In some aspects, a non-transitory computer-readable medium may store one or more instructions for wireless communication. The one or more instructions, when executed by one or more processors of a base station, may cause the one or more processors to transmit, to a UE, an indication of a frequency allocation of at least one of a dynamic resource grant, an SPS activation message or assignment, or a CORESET configuration for one or more communications with the UE, and transmit, to the UE, a set of CSI-RSs having a configuration that is based at least in part on the frequency allocation of the at least one of the dynamic resource grant, the SPS activation message or assignment, or the CORESET configuration.

In some aspects, an apparatus for wireless communication may include means for receiving an indication of a frequency allocation of at least one of a dynamic resource grant, an SPS activation message or assignment, or a CORESET configuration for one or more communications with a base station, and means for receiving a set of CSI-RSs having a configuration that is based at least in part on the frequency allocation of the at least one of the dynamic resource grant, the SPS activation message or assignment, or the CORESET configuration.

In some aspects, an apparatus for wireless communication may include means for transmitting, to a UE, an indication of a frequency allocation of at least one of a dynamic resource grant, an SPS activation message or assignment, or a CORESET configuration for one or more communications with the UE, and means for transmitting, to the UE, a set of CSI-RSs having a configuration that is based at least in part on the frequency allocation of the at least one of the dynamic resource grant, the SPS activation message or assignment, or the CORESET configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
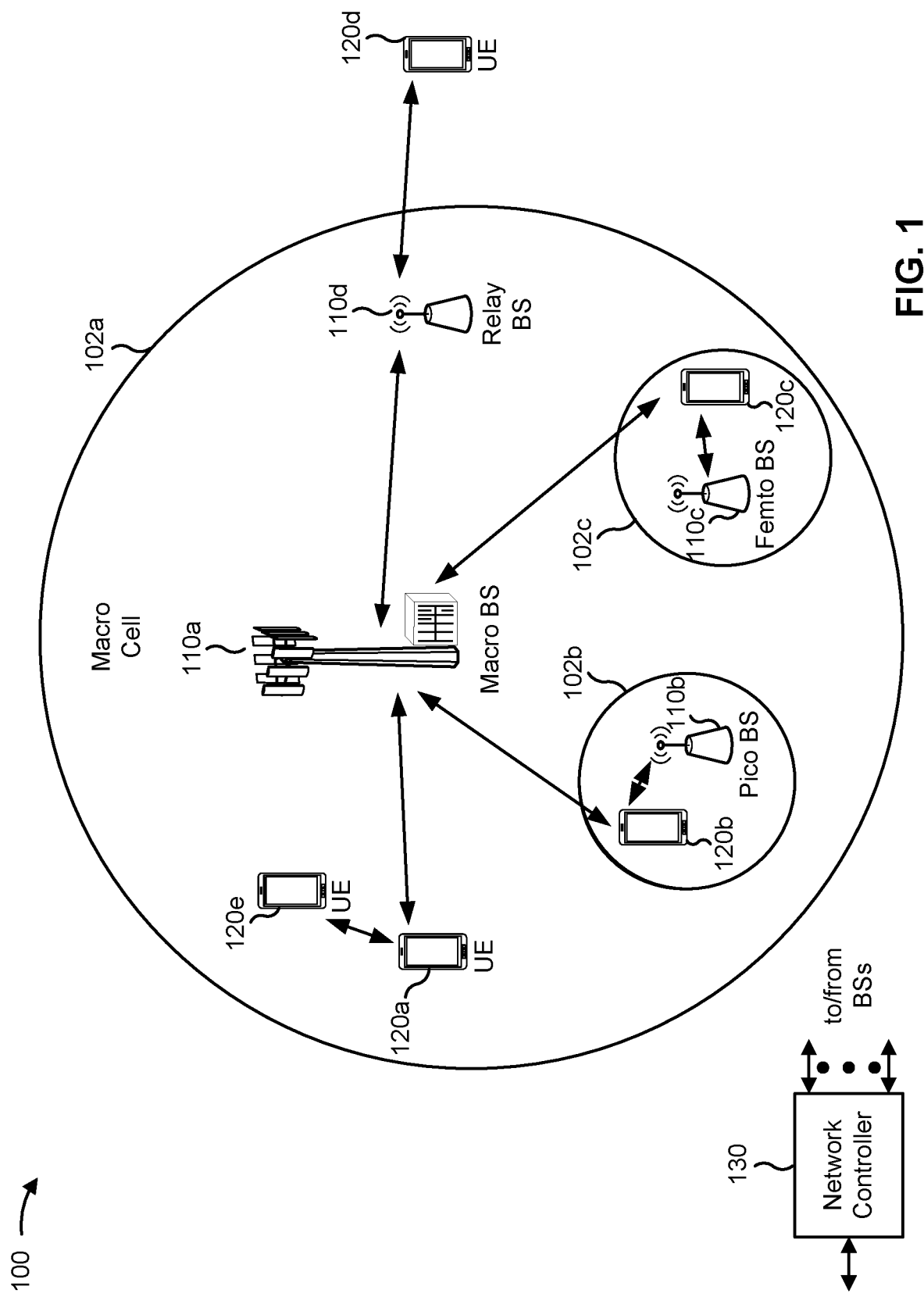
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
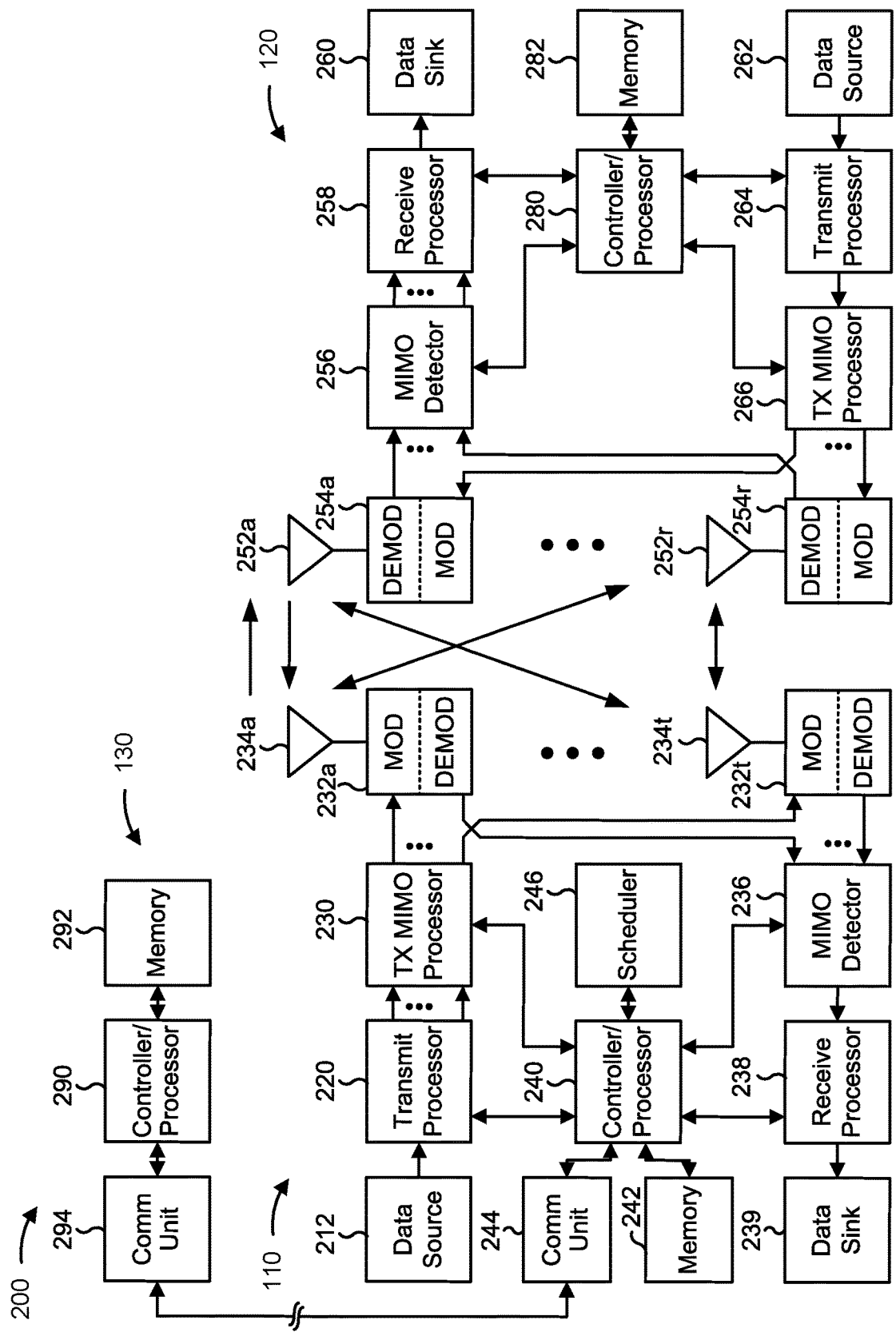
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with frequency allocation for CSI-RSs, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
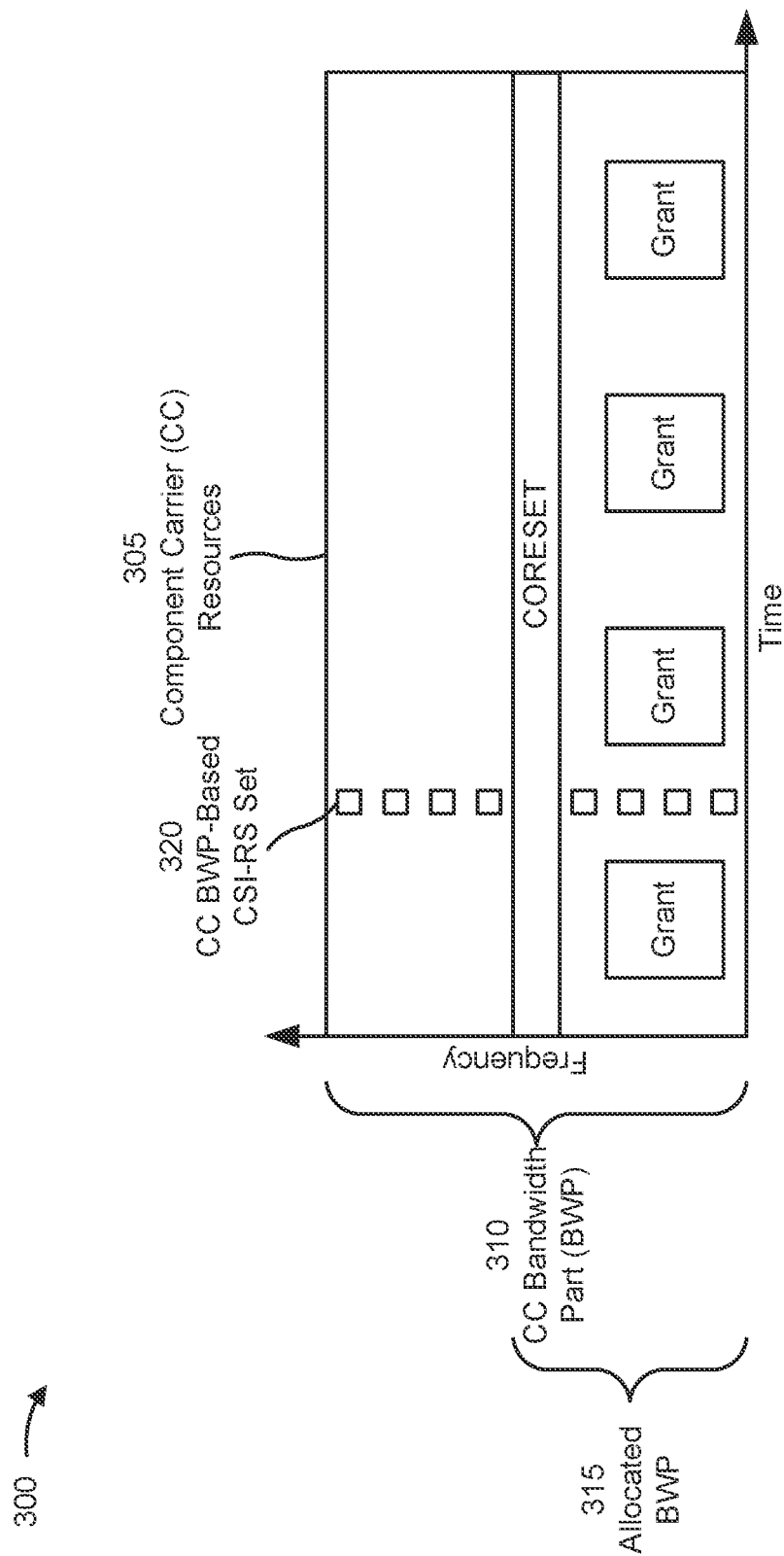
FIG. 3 is a diagram illustrating an example of an allocation of resources of a component carrier, in accordance with the present disclosure.

FIG. 3 is a diagram illustrating an example 300 of an allocation of resources of a component carrier, in accordance with the present disclosure. A base station and a UE may communicate via the resources of the component. For example, the base station may transmit one or more resources grants that indicate one or more of the resources that are allocated for additional communications.

As shown by reference number 305, a component carrier includes resources for communicating between the base station and the UE. The resources may be defined in a time domain, a frequency domain, a layer domain, and/or the like. The resources may be divided into resource blocks (RBs), slots, subframes, frames, subcarriers, and/or the like.

As shown by reference number 310, a bandwidth part (BWP) of the component carrier may include a range of frequencies that may include frequency allocations for one or more of the resources. In some aspects, the UE may be configured to communicate with the base station using any frequency within the BWP of the component carrier.

As shown by reference number 315, the BWP of the component carrier may include an allocated BWP, extending through only a portion of the BWP of the component carrier, that is allocated to a UE. In some aspects, the UE may be configured as a reduced capability UE (e.g., a reduced capability NR device) that is configured to support a relatively narrow frequency range (e.g., a frequency range with a range that is less than a range of the BWP of the component carrier).

As shown by reference number 320, the base station may schedule a set of CSI-RSs that are component carrier BWP-based for transmission via resources within the component carrier resources. The base station may schedule a bandwidth (e.g., a range from a CSI-RS having a lowest frequency to a CSI-RS having a highest frequency), a starting RB frequency (e.g., an RB scheduled for the CSI-RS having the lowest frequency), and/or the like for transmitting the set of CSI-RSs independently from any resource grants and/or a CORESET location associated with the UE.

Based at least in part on the base station scheduling the CSI-RSs independently from resource grants and/or a CORESET location associated with the UE, the base station may schedule one or more of the CSI-RSs for one or more resources that are outside of the allocated BWP. If the base station schedules one or more of the CSI-RSs for one or more resources that are outside of the allocated BWP, the UE may not receive the one or more CSI-RSs, may not measure the one or more CSI-RSs, may report incomplete CSI to the base station, and/or the like. This may cause the base station to make decisions regarding resource allocations, beam selection, and/or the like using incomplete information and may consume computing, communication, and/or network resources to detect, and recover from, errors in communications that are based at least in part on the decisions of the base station using the incomplete information.

As indicated above, FIG. 3 is provided as an example. Other examples may differ from what is described with respect to FIG. 3.

In some aspects described herein, a UE (e.g., UE 120) may receive an indication of a frequency allocation of a dynamic resource grant, an SPS activation message or assignment, a CORESET configuration, and/or the like for one or more communications with a base station (e.g., base station 110). In some aspects, the UE (e.g., a reduced capability UE) may not support communications via the entire BWP of the component carrier based at least in part on a configuration of the UE, one or more components of the UE, and/or the like. In some aspects, the frequency allocation may be located within a portion of a BWP of a component carrier (e.g., a reduced BWP), that supports communications between the UE and the base station, based at least in part on the UE not supporting communications via the entire BWP. The UE may be configured to determine a configuration of a set of CSI-RSs that is based at least in part on the frequency allocation, and the base station may transmit the set of CSI-RSs according to the configuration. The UE may be configured to receive, measure, and/or report on the set of CSI-RSs using resources within the frequency allocation configured for the UE. This may conserve computing, communication, and/or network resources that may otherwise be used to detect, and recover from, errors in communications that are based at least in part on decisions of the base station using incomplete CSI-RS information (e.g., missing information about one or more CSI-RSs that are within the BWP of a component carrier and outside of the frequency allocation).

Figure 4:
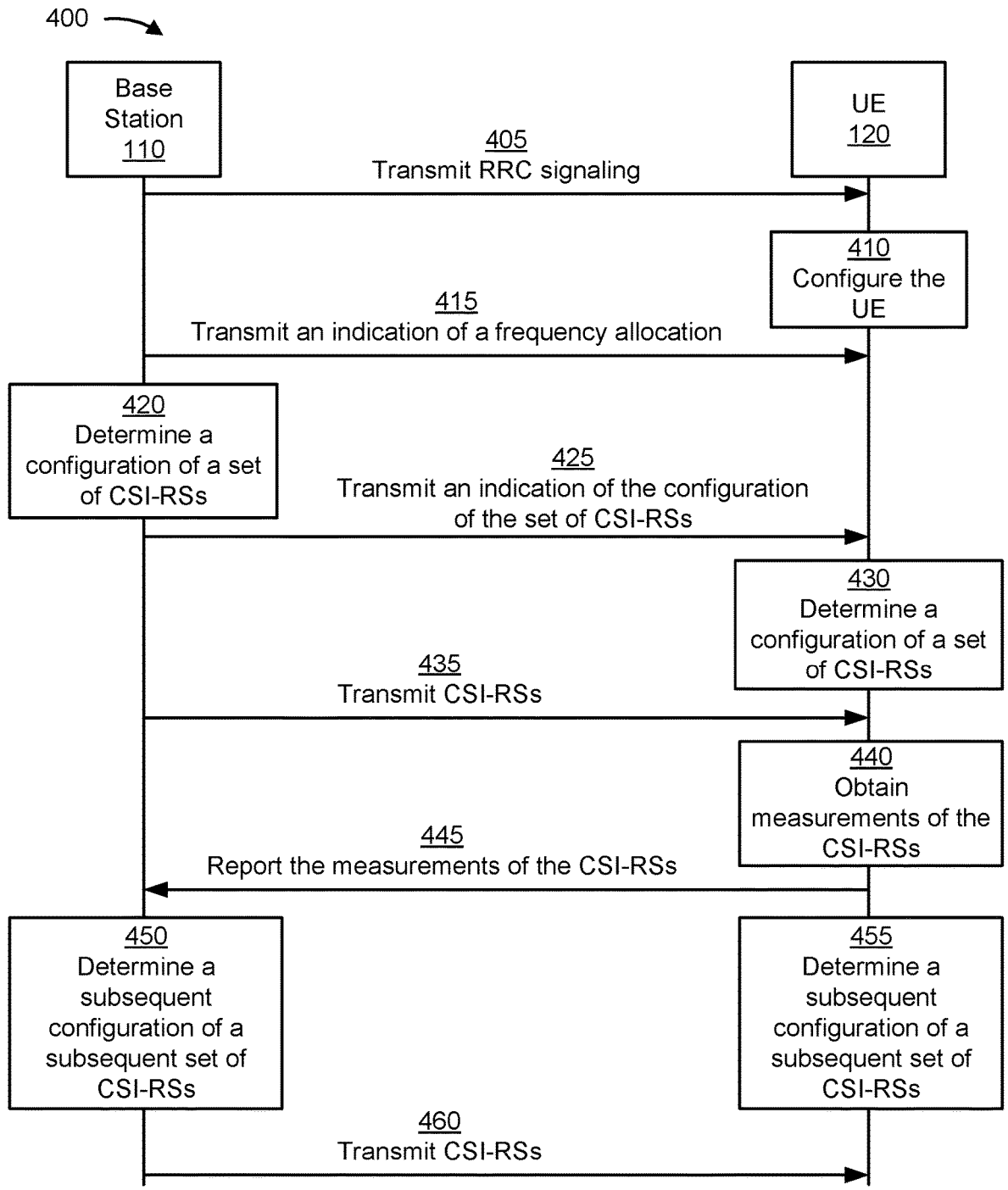
FIG. 4 is a diagram illustrating an example of frequency allocation for CSI-RSs, in accordance with the present disclosure.

FIG. 4 is a diagram illustrating an example 400 of frequency allocation for CSI-RSs, in accordance with the present disclosure. As shown in FIG. 4, a base station (e.g., base station 110) and a UE (e.g., UE 120) may communicate including radio resource control (RRC) signaling, transmitting CSI-RSs, and/or the like. The base station and the UE may be part of a wireless network (e.g., wireless network 100).

As shown by reference number 405, the base station may transmit RRC signaling to the UE. In some aspects, the base station may transmit, and the UE may receive, RRC signaling to configure the UE with one or more configurations of one or more sets of CSI-RSs. For example, a first configuration of a set of CSI-RSs may include CSI-RSs within a first frequency range and a second configuration of a set of CSI-RSs may include CSI-RSs within a second frequency range. The first frequency range may include a first bandwidth and a first starting RB and the second frequency range may include a second bandwidth and a second starting RB. In some aspects, the one or more configurations of the one or more sets of CSI-RSs may include a plurality of configurations having different bandwidths and/or different starting RBs.

As shown by reference number 410, the UE may configure the UE based at least in part on the RRC signaling. For example, the UE may be configured with the one or more configurations of the one or more sets of CSI-RSs, as indicated in the RRC signaling. In some aspects, the UE may be configured to determine a configuration of a particular set of CSI-RSs based at least in part on selecting the configuration of the particular set of CSI-RSs from the one or more configurations of the one or more sets of CSI-RSs.

As shown by reference number 415, the base station may transmit an indication of a frequency allocation. In some aspects, the UE may receive the indication of the frequency allocation associated with a dynamic resource grant, an SPS activation message or assignment, a CORESET configuration, and/or the like for one or more communications with a base station. In some aspects, the frequency allocation may be based at least in part on a capability of the UE (e.g., a configuration, one or more components, and/or the like).

As shown by reference number 420, the base station may determine a configuration of a set of CSI-RSs to transmit to the UE. In some aspects, the base station may determine the configuration of the set of CSI-RSs based at least in part on the frequency allocation of the dynamic resource grant, the SPS activation message or assignment, the CORESET configuration, and/or the like. For example, the base station may determine the configuration of the set of CSI-RSs based at least in part on the set of CSI-RSs being within the frequency allocation. In some aspects, the UE may support a reduced bandwidth that is less than a bandwidth of a component carrier that comprises the frequency allocation and the set of CSI-RSs may be associated with the reduced bandwidth.

In some aspects, the base station may determine a frequency domain configuration of the configuration of the set of CSI-RSs based at least in part on the frequency allocation of the dynamic resource grant, the SPS activation message or assignment, the CORESET configuration, and/or the like. In some aspects, the configuration of the set of CSI-RSs may indicate a time domain configuration. For example, the configuration of the set of CSI-RSs may include both a frequency domain configuration and a time domain configuration, a frequency domain configuration and not a time domain configuration, or a time domain configuration and not a frequency domain configuration.

In some aspects in which the configuration of the set of CSI-RSs includes a frequency domain configuration and not a time domain configuration, the base station may determine the time domain configuration of the configuration of the set of CSI-RSs based at least in part on another configuration of another set of CSI-RSs. For example, the configuration of the set of CSI-RSs may include a frequency domain configuration and the base station may determine the time domain configuration of the configuration of the set of CSI-RSs based at least in part on a default configuration (e.g., a configuration that is known to the base station and the UE).

As shown by reference number 425, the base station may transmit an indication of the configuration of the set of CSI-RSs to the UE. In some aspects, the base station may transmit the indication of the configuration of the set of CSI-RSs within an indication to activate a particular SPS configuration, an indication of a particular dynamic grant, an indication of a particular CORESET configuration identification, and/or the like. For example, the base station may transmit the indication of the configuration of the set of CSI-RSs along with the indication of the frequency allocation described relative to reference number 415.

In some aspects, the base station may transmit the indication of the configuration of the set of CSI-RSs via downlink control information (DCI), one or more medium access control control elements (MAC CEs), and/or the like. In some aspects, the base station may transmit an indication to activate or deactivate the configuration of the set of CSI-RSs via RRC signaling, DCI, one or more MAC CEs, and/or the like.

In some aspects, the indication may indicate that the UE is to select the configuration of the set of CSI reference signals from the one or more configurations of one or more sets of CSI-RSs configured via the RRC signaling described relative to reference number 405. In some aspects, the base station may transmit the indication of the configuration of the set of CSI-RSs via an explicit indication of the configuration of the one or more configurations. In some aspects, the indication may include the configuration of the set of CSI reference signals. In other words, the base station may indicate a configuration of the set of CSI reference signals independently from any configurations of the UE.

In some aspects, the base station may transmit an indication of a time domain configuration of the set of CSI-RSs via DCI or one or more MAC CEs that identify the time domain configuration from a set of time domain configurations configured for the UE. In some aspects, base station may transmit an indication of a time domain configuration of the set of CSI-RSs via DCI or one or more MAC CEs that include the time domain configuration. In some aspects, the base station may transmit an indication to activate or deactivate the configuration of the set of CSI-RSs via RRC signaling, DCI, one or more MAC CEs, and/or the like.

In some aspects, the indication of the time domain configuration may be included within an indication to activate a particular SPS configuration, an indication of a particular dynamic grant, an indication of a particular CORESET configuration identification, and/or the like. In some aspects, the indication of the time domain configuration may be transmitted along with the indication of the frequency domain configuration.

As shown by reference number 430, the UE may determine the configuration of the set of CSI-RSs. In some aspects, the UE may determine the configuration of the set of CSI-RSs based at least in part on the frequency allocation of the dynamic resource grant, the SPS activation message or assignment, the CORESET configuration, and/or the like.

In some aspects, the UE may determine the configuration of the set of CSI-RSs independently from any indication from the base station to indicate the configuration. In some aspects, the UE may be configured to determine the configuration of the set of CSI-RSs using a process known to the base station. In some aspects, the UE may determine the configuration of the set of CSI-RSs based at least in part on performing an operation on the frequency allocation (e.g., a CSI-RS bandwidth may be based at least in part on multiplying a bandwidth part of a resource grant or SPS by a configured value, a CSI-RS starting RB may be based at least in part on adding a configured value to a starting RB of a CORESET, and/or the like). In this way, the base station may be aware of the determination by the UE without adding overhead for additional signaling.

In some aspects, the UE may determine the configuration of the set of CSI-RSs based at least in part on selecting the configuration of the set of CSI-RSs from one or more configurations of one or more sets of CSI-RSs configured for the UE. For example, the UE may select the configuration of the set of CSI-RSs based at least in part on an indication from the base station, a determination that the configuration of the set of CSI-RSs includes CSI-RSs that are within a BWP that the UE supports, and/or the like. In some aspects, the UE may select the configuration of the set of CSI-RSs based at least in part on receiving an indication to activate a particular SPS configuration, an indication of a particular dynamic grant, an indication of a particular CORESET configuration identification, an indication of the configuration (e.g., an indication of the configuration without reference to a configuration already configured for the UE), and/or the like.

In some aspects, the UE may determine a frequency domain configuration of the configuration of the set of CSI-RSs based at least in part on the frequency allocation of the dynamic resource grant, the SPS activation message or assignment, the CORESET configuration, and/or the like. In some aspects, the UE may determine a frequency domain configuration of the configuration of the set of CSI-RSs based at least in part on an indication, from the base station, of the frequency domain configuration.

In some aspects, the UE may determine a time domain configuration for the configuration of the set of CSI-RSs based at least in part on the configuration of the set of CSI-RSs indicating (e.g., explicitly) the time domain configuration. In some aspects, the UE may determine a time domain configuration for the configuration of the set of CSI-RSs based at least in part on another configuration of another set of CSI-RSs. For example, the time domain configuration may be based at least in part on a default time domain configuration (e.g., a time domain configuration that would be used if the UE were configured to communicate via the entire bandwidth of the component carrier).

In some aspects, the UE may determine a time domain configuration for the configuration of the set of CSI-RSs based at least in part on DCI, one or more MAC CEs, and/or the like that identify the time domain configuration from a set of time domain configurations configured by the UE (e.g., based at least in part on RRC signaling). In some aspects, the UE may determine a time domain configuration for the configuration of the set of CSI-RSs based at least in part on DCI, one or more MAC CEs, and/or the like that include the time domain configuration.

As shown by reference number 435, the base station may transmit the set of CSI-RSs based at least in part on the configuration of the set of CSI-RSs. For example, the base station may transmit the set of CSI-RSs within a reduced bandwidth part that corresponds to the frequency allocation of a dynamic resource grant, an SPS activation message or assignment, or a CORESET configuration.

As shown by reference number 440, the UE may obtain measurements of the set of CSI-RSs. In some aspects, the UE may monitor resources scheduled for the set of CSI-RSs to obtain the measurements. In some aspects, the measurements may be used to determine RSRP, RSSI, RSRQ, CQI, and/or the like for CSI-RSs of the set of CSI-RSs.

As shown by reference number 445, the UE may report the measurements of the CSI-RSs. For example, the UE may report RSRP, RSSI, RSRQ, CQI, and/or the like for CSI-RSs of the set of CSI-RSs.

As shown by reference number 450, the base station may determine a subsequent configuration of a subsequent set of CSI-RSs. In some aspects, the subsequent configuration may be associated with a periodic or semi-static time configuration, between dynamic grants, CORESETs, SPS, and/or the like.

In some aspects, the base station may determine the subsequent configuration based at least in part on the configuration of the set of CSI-RSs. For example, the base station may continue to use the configuration of the set of CSI-RSs (e.g., associated with the frequency allocation of the dynamic resource grant, the SPS activation message or assignment, or the CORESET configuration) as the subsequent configuration of the subsequent set of CSI-RSs. In some aspects, the base station may continue to use the configuration of the set of CSI-RSs as the subsequent configuration of the subsequent set of CSI-RSs based at least in part on the subsequent configuration being associated with a subsequent dynamic resource grant, a subsequent SPS activation message or assignment, or a subsequent CORESET that is scheduled for an amount of time, that satisfies a threshold (e.g., less than, or less than or equal to, the threshold), after the communications associated with the dynamic resource grant, the SPS activation message or assignment, or the CORESET.

In some aspects, the base station may determine to use a subsequent configuration that is different from the configuration of the set of CSI-RSs. For example, the base station may determine to use a default configuration (e.g., a configured default configuration) for the subsequent set of CSI-RSs associated with a subsequent dynamic resource grant, a subsequent SPS activation message or assignment, or a subsequent CORESET. The base station may determine to use the default configuration based at least in part on the subsequent dynamic resource grant, the subsequent SPS activation message or assignment, or the subsequent CORESET being scheduled for an amount of time, that satisfies a threshold (e.g., greater than, or greater than or equal to, the threshold), after the communications associated with the dynamic resource grant, the SPS activation message or assignment, or the CORESET. In some aspects, the amount of time may include a threshold number of symbols, slots, and/or the like.

As shown by reference number 455, the UE may determine the subsequent configuration of the subsequent set of CSI-RSs. In some aspects, the UE may determine the subsequent configuration of the subsequent set of CSI-RSs using a same process as described for the base station with reference to reference number 450. In this way, the UE and the base station may agree on the subsequent configuration.

For example, in some aspects, the UE may determine the subsequent configuration based at least in part on the configuration of the set of CSI-RSs. In some aspects, the base station may determine to use a subsequent configuration that is different from the configuration of the set of CSI-RSs.

As shown by reference number 460, the base station may transmit the subsequent set of CSI-RSs based at least in part on the configuration of the subsequent set of CSI-RSs. For example, the base station may transmit the subsequent set of CSI-RSs within an increased bandwidth part or a reduced bandwidth part that corresponds to the frequency allocation of a dynamic resource grant, an SPS activation message or assignment, or a CORESET configuration.

In this way, the UE may be configured to receive, measure, and/or report on the set of CSI-RSs using resources within the frequency allocation configured for the UE. This may conserve computing, communication, and/or network resources that may otherwise be used to detect, and, recover from, errors in communications that are based at least in part on decisions of the base station using incomplete CSI-RS information (e.g., missing information about one or more CSI-RSs that are outside of the frequency allocation).

As indicated above, FIG. 4 is provided as an example. Other examples may differ from what is described with respect to FIG. 4.

Figure 5:
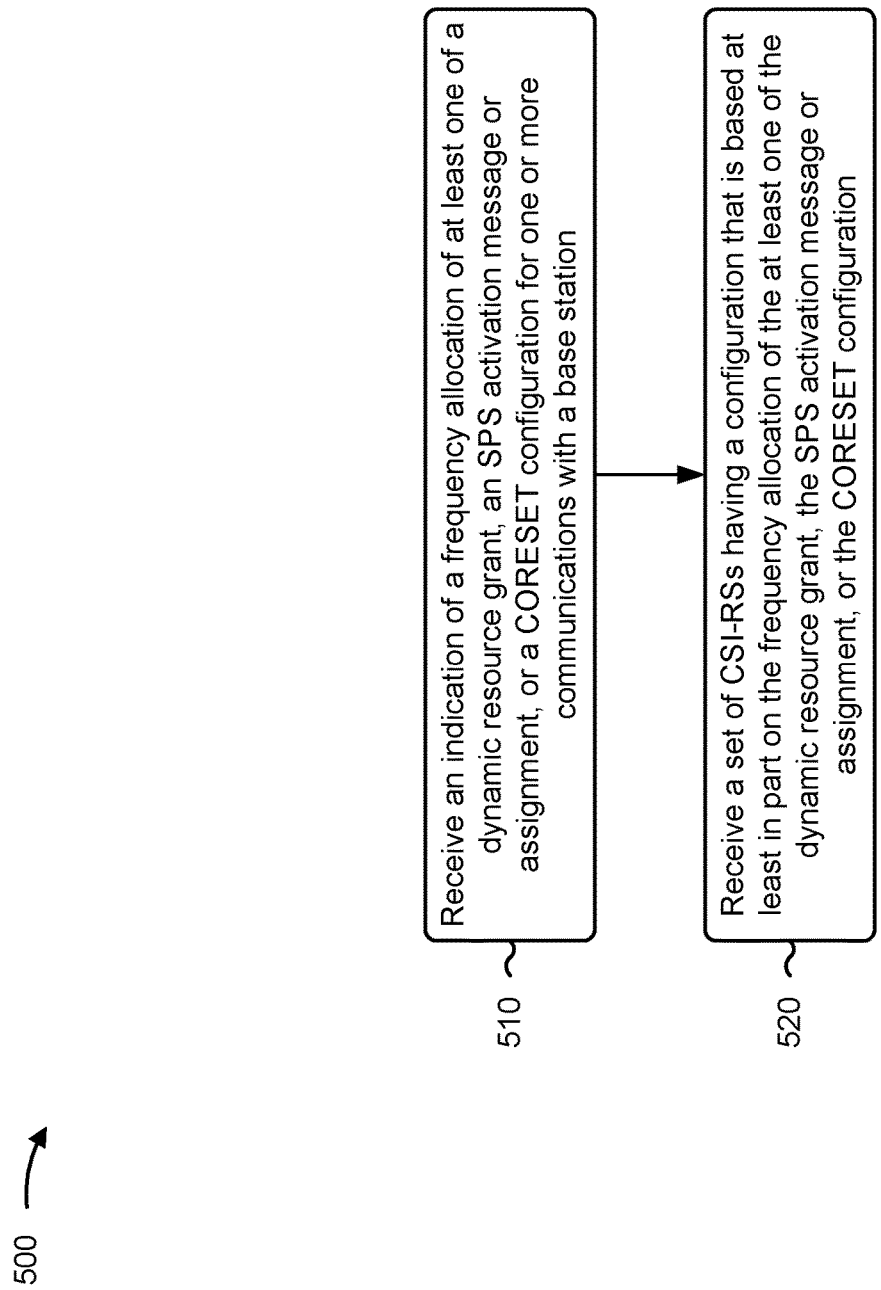
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with frequency allocation for CSI-RSs.

As shown in FIG. 5, in some aspects, process 500 may include receiving an indication of a frequency allocation of at least one of a dynamic resource grant, an SPS activation message or assignment, or a CORESET configuration for one or more communications with a base station (block 510). For example, the UE (e.g., using receive processor 258, controller/processor 280, memory 282, and/or the like) may receive an indication of a frequency allocation of at least one of a dynamic resource grant, an SPS activation message or assignment, or a CORESET configuration for one or more communications with a base station, as described above.

As further shown in FIG. 5, in some aspects, process 500 may include receiving a set of CSI-RSs having a configuration that is based at least in part on the frequency allocation of the at least one of the dynamic resource grant, the SPS activation message or assignment, or the CORESET configuration (block 520). For example, the UE (e.g., using receive processor 258, controller/processor 280, memory 282, and/or the like) may receive a set of CSI-RSs having a configuration that is based at least in part on the frequency allocation of the at least one of the dynamic resource grant, the SPS activation message or assignment, or the CORESET configuration, as described above. In some aspects, process 500 may further including transmitting, for the UE, the set of CSI-RSs having the configuration that is based at least in part on the frequency allocation of the at least one of the dynamic resource grant, the SPS activation message or assignment, or the CORESET configuration, as described above.

Process 500 may include additional aspects, such as any single aspect or any combination of aspects described below and/or in connection with one or more other processes described elsewhere herein.

In a first aspect, the UE supports a reduced bandwidth that is less than a bandwidth of a component carrier that comprises the frequency allocation of the at least one of the dynamic resource grant, the SPS activation message or assignment, or the CORESET configuration, and the set of CSI-RSs is associated with the reduced bandwidth.

In a second aspect, alone or in combination with the first aspect, process 500 includes obtaining measurements of the set of CSI-RSs based at least in part on the configuration of the set of CSI-RSs, and reporting the measurements of the set of CSI-RSs.

In a third aspect, alone or in combination with one or more of the first and second aspects, process 500 includes determining a subsequent configuration of a subsequent set of CSI-RSs based at least in part on one or more of the configuration of the set of CSI-RSs, or a default configuration.

In a fourth aspect, alone or in combination with one or more of the first through third aspects, the subsequent set of CSI-RSs is associated with a subsequent dynamic resource grant, a subsequent SPS activation message or assignment, or a subsequent CORESET configuration for subsequent communications with the base station, and the subsequent communications with the base station are scheduled for an amount of time, that satisfies a threshold, after the communications with the base station.

In a fifth aspect, alone or in combination with one or more of the first through fourth aspects, process 500 includes receiving RRC signaling to configure the UE with one or more configurations of one or more sets of CSI-RSs, and selecting the configuration of the set of CSI-RSs from the one or more configurations of one or more sets of CSI-RSs.

In a sixth aspect, alone or in combination with one or more of the first through fifth aspects, selecting the configuration of the set of CSI-RSs includes selecting the configuration of the set of CSI-RSs based at least in part on receiving one or more of an indication to activate a particular SPS configuration, an indication of a particular dynamic grant, an indication of a particular CORESET configuration identification, or an indication of the configuration of the one or more configurations.

In a seventh aspect, alone or in combination with one or more of the first through sixth aspects, process 500 includes receiving one or more of the indications via one or more of DCI or a MAC CE.

In an eighth aspect, alone or in combination with one or more of the first through seventh aspects, process 500 includes receiving an indication to activate or deactivate the configuration of the set of CSI-RSs via one or more of RRC signaling, DCI, or one or more MAC CEs.

In a ninth aspect, alone or in combination with one or more of the first through eighth aspects, process 500 includes receiving an indication of a frequency domain configuration of the configuration of the set of CSI-RSs via one or more of DCI including the dynamic resource grant, DCI including the SPS activation message or assignment, or RRC signaling that indicates the CORESET configuration.

In a tenth aspect, alone or in combination with one or more of the first through ninth aspects, the set of CSI-RSs has a frequency domain configuration that is based at least in part on the frequency allocation of the at least one of the dynamic resource grant, the SPS activation message or assignment, or the CORESET configuration.

In an eleventh aspect, alone or in combination with one or more of the first through tenth aspects, the set of CSI-RSs has a frequency domain configuration that is based at least in part on an indication, from the base station, of the frequency domain configuration.

In a twelfth aspect, alone or in combination with one or more of the first through eleventh aspects, the configuration of the set of CSI-RSs indicates a time domain configuration.

In a thirteenth aspect, alone or in combination with one or more of the first through twelfth aspects, process 500 includes determining a time domain configuration of the configuration of the set of CSI-RSs based at least in part on another configuration of another set of CSI-RSs.

In a fourteenth aspect, alone or in combination with one or more of the first through thirteenth aspects, process 500 includes determining a time domain configuration of the configuration of the set of CSI-RSs based at least in part on one or more of DCI or a MAC CE that identifies the time domain configuration from a set of time domain configurations configured by the UE, or DCI or a MAC CE that includes the time domain configuration.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
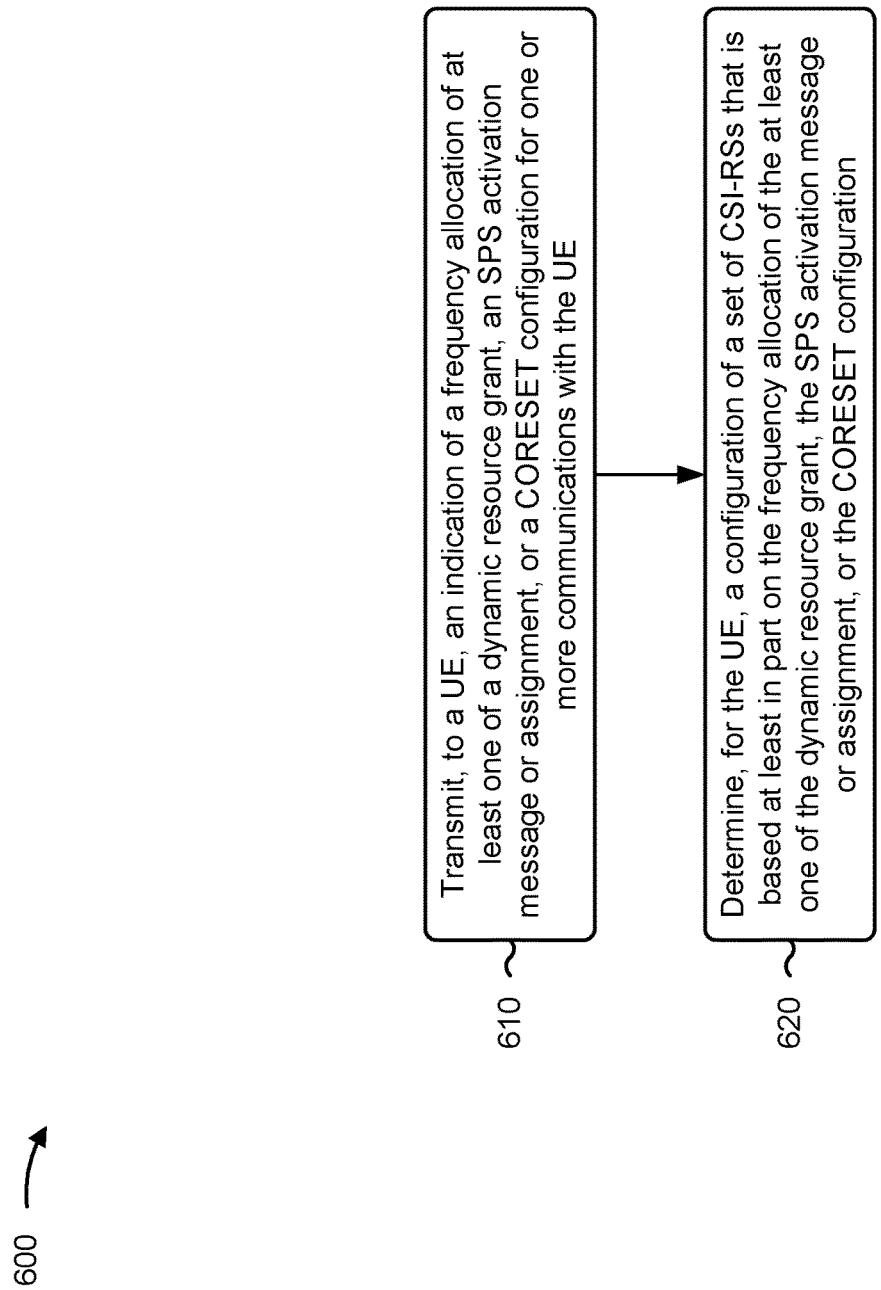
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with frequency allocation for CSI-RSs.

As shown in FIG. 6, in some aspects, process 600 may include transmitting, to a UE, an indication of a frequency allocation of at least one of a dynamic resource grant, an SPS activation message or assignment, or a CORESET configuration for one or more communications with the UE (block 610). For example, the base station (e.g., using transmit processor 220, controller/processor 240, memory 242, and/or the like) may transmit, to a UE, an indication of a frequency allocation of at least one of a dynamic resource grant, an SPS activation message or assignment, or a CORESET configuration for one or more communications with the UE, as described above.

As further shown in FIG. 6, in some aspects, process 600 may include determining, for the UE, a configuration of a set of CSI-RSs that is based at least in part on the frequency allocation of the at least one of the dynamic resource grant, the SPS activation message or assignment, or the CORESET configuration (block 620). For example, the base station (e.g., using controller/processor 240, memory 242, and/or the like) may determine, for the UE, a configuration of a set of CSI-RSs that is based at least in part on the frequency allocation of the at least one of the dynamic resource grant, the SPS activation message or assignment, or the CORESET configuration, as described above.

Process 600 may include additional aspects, such as any single aspect or any combination of aspects described below and/or in connection with one or more other processes described elsewhere herein.

In a first aspect, the UE supports a reduced bandwidth that is less than a bandwidth of a component carrier that comprises the frequency allocation of the at least one of the dynamic resource grant, the SPS activation message or assignment, or the CORESET configuration, and the set of CSI-RSs is associated with the reduced bandwidth.

In a second aspect, alone or in combination with the first aspect, process 600 includes receiving a report of measurements of the set of CSI-RSs.

In a third aspect, alone or in combination with one or more of the first and second aspects, process 600 includes determining a subsequent configuration of a subsequent set of CSI-RSs based at least in part on one or more of the configuration of the set of CSI-RSs or a default configuration for the UE.

In a fourth aspect, alone or in combination with one or more of the first through third aspects, the subsequent set of CSI-RSs is associated with a subsequent dynamic resource grant, a subsequent SPS activation message or assignment, or a subsequent CORESET configuration for subsequent communications with the UE, and the subsequent communications with the UE are scheduled for an amount of time, that satisfies a threshold, after the communications with the UE.

In a fifth aspect, alone or in combination with one or more of the first through fourth aspects, process 600 includes transmitting RRC signaling to configure the UE with one or more configurations of one or more sets of CSI-RSs, wherein the UE is to determine the configuration of the set of CSI-RSs based at least in part on selecting the configuration of the set of CSI-RSs from the one or more configurations of one or more sets of CSI-RSs.

In a sixth aspect, alone or in combination with one or more of the first through fifth aspects, process 600 includes transmitting an indication of the configuration of the set of CSI-RSs, for selection by the UE, within one or more of an indication to activate a particular SPS configuration, an indication of a particular dynamic grant, an indication of a particular CORESET configuration identification, or an explicit indication of the configuration of the one or more configurations.

In a seventh aspect, alone or in combination with one or more of the first through sixth aspects, process 600 includes transmitting the explicit indication via one or more of DCI or a MAC CE.

In an eighth aspect, alone or in combination with one or more of the first through seventh aspects, process 600 includes transmitting an indication to activate or deactivate the configuration of the set of CSI-RSs via one or more of RRC signaling, DCI, or one or more MAC CEs.

In a ninth aspect, alone or in combination with one or more of the first through eighth aspects, process 600 includes transmitting an indication of a frequency domain configuration of the configuration of the set of CSI-RSs via one or more of: DCI including the dynamic resource grant, DCI including the SPS activation message or assignment, or RRC signaling that indicates the CORESET configuration.

In a tenth aspect, alone or in combination with one or more of the first through ninth aspects, determining the configuration of the set of CSI-RSs includes determining a frequency domain configuration of the configuration of the set of CSI-RSs based at least in part on the frequency allocation of at least one of the dynamic resource grant, the SPS activation message or assignment, or the CORESET configuration.

In an eleventh aspect, alone or in combination with one or more of the first through tenth aspects, the configuration of the set of CSI-RSs indicates a time domain configuration.

In a twelfth aspect, alone or in combination with one or more of the first through eleventh aspects, process 600 includes determining a time domain configuration of the configuration of the set of CSI-RSs based at least in part on another configuration of another set of CSI-RSs.

In a thirteenth aspect, alone or in combination with one or more of the first through twelfth aspects, process 600 includes determining a time domain configuration of the configuration of the set of CSI-RSs, and transmitting an indication of the time domain configuration of the set of CSI-RSs via one or more of DCI or a MAC CE that identifies the time domain configuration from a set of time domain configurations configured for the UE, or DCI or a MAC CE that includes the time domain configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving an indication of a frequency allocation of at least one of a dynamic resource grant, a semi-persistent scheduling (SPS) activation message or assignment, or a control resource set (CORESET) configuration for one or more communications with a base station; and receiving a set of channel state information reference signals having a configuration that is based at least in part on the frequency allocation of the at least one of the dynamic resource grant, the SPS activation message or assignment, or the CORESET configuration.

Aspect 2: The method of Aspect 1, wherein the UE supports a reduced bandwidth that is less than a bandwidth of a component carrier that comprises the frequency allocation of the at least one of the dynamic resource grant, the SPS activation message or assignment, or the CORESET configuration, and wherein the set of channel state information reference signals is associated with the reduced bandwidth.

Aspect 3: The method of any of Aspects 1 through 2, further comprising: determining a subsequent configuration of a subsequent set of channel state information reference signals based at least in part on one or more of: the configuration of the set of channel state information reference signals, or a default configuration.

Aspect 4: The method of Aspect 3, wherein the subsequent set of channel state information reference signals is associated with a subsequent dynamic resource grant, a subsequent SPS activation message or assignment, or a subsequent CORESET configuration for subsequent communications with the base station, and wherein the subsequent communications with the base station are scheduled for an amount of time, that satisfies a threshold, after the communications with the base station.

Aspect 5: The method of any of Aspects 1 through 4, further comprising: receiving radio resource control signaling to configure the UE with one or more configurations of one or more sets of channel state information reference signals; and selecting the configuration of the set of channel state information reference signals from the one or more configurations of one or more sets of channel state information reference signals.

Aspect 6: The method of Aspect 5, wherein selecting the configuration of the set of channel state information reference signals comprises: selecting the configuration of the set of channel state information reference signals based at least in part on receiving one or more of: an indication to activate a particular SPS configuration, an indication of a particular dynamic grant, an indication of a particular CORESET configuration identification, or an indication of the configuration of the one or more configurations.

Aspect 7: The method of any of Aspects 1 through 6, further comprising: receiving an indication to activate or deactivate the configuration of the set of channel state information reference signals via one or more of: radio resource control signaling, downlink control information, or one or more medium access control control elements.

Aspect 8: The method of any of Aspects 1 through 7, further comprising: receiving an indication of a frequency domain configuration of the configuration of the set of channel state information reference signals via one or more of: downlink control information including the dynamic resource grant, downlink control information including the SPS activation message or assignment, or radio resource control signaling that indicates the CORESET configuration.

Aspect 9: The method of any of Aspects 1 through 8, wherein the set of channel state information reference signals has a frequency domain configuration based at least in part on the frequency allocation of the at least one of the dynamic resource grant, the SPS activation message or assignment, or the CORESET configuration.

Aspect 10: The method of any of Aspects 1 through 9, wherein the set of channel state information reference signals has a frequency domain configuration based at least in part on an indication, from the base station, of the frequency domain configuration.

Aspect 11: The method of any of Aspects 1 through 10, wherein the configuration of the set of channel state information reference signals indicates a time domain configuration.

Aspect 12: The method of any of Aspects 1 through 11, wherein the set of channel state information reference signals has a time domain configuration based at least in part on one or more of: downlink control information or a medium access control control element that identifies the time domain configuration from a set of time domain configurations configured for the UE, downlink control information or a medium access control control element that includes the time domain configuration, or another configuration of another set of channel state information reference signals.

Aspect 13: An apparatus for wireless communication at a device, comprising a processor; memory coupled with the processor; and instructions stored in the memory and executable by the processor to cause the apparatus to perform the method of one or more Aspects of Aspects 1-12.

Aspect 14: A device for wireless communication, comprising a memory and one or more processors coupled to the memory, the memory and the one or more processors configured to perform the method of one or more Aspects of Aspects 1-12.

Aspect 15: An apparatus for wireless communication, comprising at least one means for performing the method of one or more Aspects of Aspects 1-12.

Aspect 16: A non-transitory computer-readable medium storing code for wireless communication, the code comprising instructions executable by a processor to perform the method of one or more Aspects of Aspects 1-12.

Aspect 17: A non-transitory computer-readable medium storing a set of instructions for wireless communication, the set of instructions comprising one or more instructions that, when executed by one or more processors of a device, cause the device to perform the method of one or more Aspects of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving signaling to configure the UE with a first configuration of one or more sets of channel state information reference signals and a second configuration of the one or more sets of channel state information reference signals, the first configuration being associated with a first frequency range and the second configuration being associated with a second frequency range, the UE comprising a reduced capability UE, and the second frequency range being outside of a frequency range supported by the reduced capability UE;
   receiving an indication of a frequency allocation of at least one of a dynamic resource grant, a semi-persistent scheduling (SPS) activation message or assignment, or a control resource set (CORESET) configuration for one or more communications with a base station,
      the first frequency range being within the frequency allocation of the at least one of the dynamic resource grant, the SPS activation message or assignment, or the CORESET configuration, and
      the second frequency range not being within the frequency allocation of the at least one of the dynamic resource grant, the SPS activation message or assignment, or the CORESET configuration; and
   receiving a set of channel state information reference signals having the first configuration based at least in part on the first frequency range being within the frequency allocation of the at least one of the dynamic resource grant, the SPS activation message or assignment, or the CORESET configuration.

2. The method of claim 1, wherein the UE supports a reduced bandwidth that is less than a bandwidth of a component carrier that comprises the frequency allocation of the at least one of the dynamic resource grant, the SPS activation message or assignment, or the CORESET configuration, and
   wherein the set of channel state information reference signals is associated with the reduced bandwidth.

3. The method of claim 1, further comprising:
   determining a subsequent configuration of a subsequent set of channel state information reference signals based at least in part on one or more of:
      the first configuration of the set of channel state information reference signals, or
      a default configuration.

4. The method of claim 3, wherein the subsequent set of channel state information reference signals is associated with a subsequent dynamic resource grant, a subsequent SPS activation message or assignment, or a subsequent CORESET configuration for subsequent communications with the base station, and
   wherein the subsequent communications with the base station are scheduled for an amount of time, that satisfies a threshold, after the one or more communications with the base station.

5. The method of claim 1, further comprising:
   selecting the first configuration of the set of channel state information reference signals based at least in part on the first configuration including one or more channel state information reference signals within the frequency allocation.

6. The method of claim 5, wherein selecting the first configuration of the set of channel state information reference signals comprises:
   selecting the first configuration of the set of channel state information reference signals based at least in part on receiving one or more of:
      an indication to activate a particular SPS configuration,
      an indication of a particular dynamic grant,
      an indication of a particular CORESET configuration identification, or an indication of the configuration of the one or more configurations.

7. The method of claim 1, further comprising:
receiving an indication to activate or deactivate the first configuration of the set of channel state information reference signals via one or more of:
radio resource control signaling,
downlink control information, or
one or more medium access control control elements.

8. The method of claim 1, further comprising:
receiving an indication of a frequency domain configuration of the first configuration of the set of channel state information reference signals via one or more of:
downlink control information including the dynamic resource grant,
downlink control information including the SPS activation message or assignment, or
radio resource control signaling that indicates the CORESET configuration.

9. The method of claim 1, wherein the set of channel state information reference signals has a frequency domain configuration based at least in part on the frequency allocation of the at least one of the dynamic resource grant, the SPS activation message or assignment, or the CORESET configuration.

10. The method of claim 1, wherein the set of channel state information reference signals has a frequency domain configuration based at least in part on an indication, from the base station, of the frequency domain configuration.

11. The method of claim 1, wherein the first configuration of the set of channel state information reference signals indicates a time domain configuration.

12. The method of claim 1, wherein the set of channel state information reference signals has a time domain configuration based at least in part on one or more of:
downlink control information or a medium access control control element that identifies the time domain configuration from a set of time domain configurations configured for the UE,
downlink control information or a medium access control control element that includes the time domain configuration, or
another configuration of another set of channel state information reference signals.

13. A user equipment (UE) for wireless communication, comprising:
one or more memories; and
one or more processors coupled to the one or more memories, the one or more processors configured to:
receive signaling to configure the UE with a first configuration of one or more sets of channel state information reference signals and a second configuration of the one or more sets of channel state information reference signals, the first configuration being associated with a first frequency range and the second configuration being associated with a second frequency range, the UE comprising a reduced capability UE, and the second frequency range being outside of a frequency range supported by the reduced capability UE;
receive an indication of a frequency allocation of at least one of a dynamic resource grant, a semi-persistent scheduling (SPS) activation message or assignment, or a control resource set (CORESET) configuration for one or more communications with a base station,
the first frequency range being within the frequency allocation of the at least one of the dynamic resource grant, the SPS activation message or assignment, or the CORESET configuration, and
the second frequency range not being within the frequency allocation of the at least one of the dynamic resource grant, the SPS activation message or assignment, or the CORESET configuration; and
receive a set of channel state information reference signals having the first configuration based at least in part on the first frequency range being within the frequency allocation of the at least one of the dynamic resource grant, the SPS activation message or assignment, or the CORESET configuration.

14. The UE of claim 13, wherein the UE supports a reduced bandwidth that is less than a bandwidth of a component carrier that comprises the frequency allocation of the at least one of the dynamic resource grant, the SPS activation message or assignment, or the CORESET configuration, and
wherein the set of channel state information reference signals is associated with the reduced bandwidth.

15. The UE of claim 13, wherein the one or more processors are further configured to:
determine a subsequent configuration of a subsequent set of channel state information reference signals based at least in part on one or more of:
the first configuration of the set of channel state information reference signals, or
a default configuration.

16. The UE of claim 15, wherein the subsequent set of channel state information reference signals is associated with a subsequent dynamic resource grant, a subsequent SPS activation message or assignment, or a subsequent CORESET configuration for subsequent communications with the base station, and
wherein the subsequent communications with the base station are scheduled for an amount of time, that satisfies a threshold, after the one or more communications with the base station.

17. The UE of claim 13, wherein the one or more processors are further configured to:
select the first configuration of the set of channel state information reference signals based at least in part on the first configuration including one or more channel state information reference signals within the frequency allocation.

18. The UE of claim 17, wherein the one or more processors, when selecting the configuration of the set of channel state information reference signals, are configured to:
select the first configuration of the set of channel state information reference signals based at least in part on receiving one or more of:
an indication to activate a particular SPS configuration,
an indication of a particular dynamic grant,
an indication of a particular CORESET configuration identification, or
an indication of the configuration of the one or more configurations.

19. The UE of claim 13, wherein the one or more processors are further configured to:
receive an indication to activate or deactivate the first configuration of the set of channel state information reference signals via one or more of:

radio resource control signaling,
downlink control information, or
one or more medium access control control elements.

20. The UE of claim 13, wherein the one or more processors are further configured to:
receive an indication of a frequency domain configuration of the first configuration of the set of channel state information reference signals via one or more of:
downlink control information including the dynamic resource grant,
downlink control information including the SPS activation message or assignment, or
radio resource control signaling that indicates the CORESET configuration.

21. The UE of claim 13, wherein the set of channel state information reference signals has a frequency domain configuration based at least in part on the frequency allocation of the at least one of the dynamic resource grant, the SPS activation message or assignment, or the CORESET configuration.

22. The UE of claim 13, wherein the set of channel state information reference signals has a frequency domain configuration based at least in part on an indication, from the base station, of the frequency domain configuration.

23. The UE of claim 13, wherein the first configuration of the set of channel state information reference signals indicates a time domain configuration.

24. The UE of claim 13, wherein the set of channel state information reference signals has a time domain configuration based at least in part on one or more of:
downlink control information or a medium access control control element that identifies the time domain configuration from a set of time domain configurations configured for the UE,
downlink control information or a medium access control control element that includes the time domain configuration, or
another configuration of another set of channel state information reference signals.

25. A non-transitory computer-readable medium storing a set of instructions for wireless communication, the set of instructions comprising:
one or more instructions that, when executed by one or more processors of a user equipment (UE), cause the UE to:
receive signaling to configure the UE with a first configuration of one or more sets of channel state information reference signals and a second configuration of the one or more sets of channel state information reference signals, the first configuration being associated with a first frequency range and the second configuration being associated with a second frequency range, the UE comprising a reduced capability UE, and the second frequency range being outside of a frequency range supported by the reduced capability UE;
receive an indication of a frequency allocation of at least one of a dynamic resource grant, a semi-persistent scheduling (SPS) activation message or assignment, or a control resource set (CORESET) configuration for one or more communications with a base station,
the first frequency range being within the frequency allocation of the at least one of the dynamic resource grant, the SPS activation message or assignment, or the CORESET configuration, and
the second frequency range not being within the frequency allocation of the at least one of the dynamic resource grant, the SPS activation message or assignment, or the CORESET configuration; and
receive a set of channel state information reference signals having the first configuration based at least in part on the first frequency range being within the frequency allocation of the at least one of the dynamic resource grant, the SPS activation message or assignment, or the CORESET configuration.

26. The non-transitory computer-readable medium of claim 25, wherein the UE supports a reduced bandwidth that is less than a bandwidth of a component carrier that comprises the frequency allocation of the at least one of the dynamic resource grant, the SPS activation message or assignment, or the CORESET configuration, and
wherein the set of channel state information reference signals is associated with the reduced bandwidth.

27. The non-transitory computer-readable medium of claim 25, wherein the one or more instructions further cause the UE to:
determine a subsequent configuration of a subsequent set of channel state information reference signals based at least in part on one or more of:
the first configuration of the set of channel state information reference signals, or
a default configuration.

28. An apparatus for wireless communication, comprising:
means for receiving signaling to configure the apparatus with a first configuration of one or more sets of channel state information reference signals and a second configuration of the one or more sets of channel state information reference signals, the first configuration being associated with a first frequency range and the second configuration being associated with a second frequency range, the apparatus comprising a reduced capability apparatus, and the second frequency range being outside of a frequency range supported by the reduced capability apparatus;
means for receiving an indication of a frequency allocation of at least one of a dynamic resource grant, a semi-persistent scheduling (SPS) activation message or assignment, or a control resource set (CORESET) configuration for one or more communications with a base station,
the first frequency range being within the frequency allocation of the at least one of the dynamic resource grant, the SPS activation message or assignment, or the CORESET configuration, and
the second frequency range not being within the frequency allocation of the at least one of the dynamic resource grant, the SPS activation message or assignment, or the CORESET configuration; and
means for receiving a set of channel state information reference signals having the first configuration based at least in part on the first frequency range being within the frequency allocation of the at least one of the dynamic resource grant, the SPS activation message or assignment, or the CORESET configuration.

29. The apparatus of claim 28, wherein the apparatus supports a reduced bandwidth that is less than a bandwidth of a component carrier that comprises the frequency allocation of the at least one of the dynamic resource grant, the SPS activation message or assignment, or the CORESET configuration, and wherein the set of channel state information reference signals is associated with the reduced bandwidth.

30. The apparatus of claim 28, wherein a subsequent configuration of a subsequent set of channel state information reference signals is determined based at least in part on one or more of:
 the first configuration of the set of channel state information reference signals, or
 a default configuration.

* * * * *